United States Patent [19]
Guillon et al.

[11] 4,456,928
[45] Jun. 26, 1984

[54] INTEGRATED INTERFACE CIRCUIT BETWEEN A TELEVISION RECEIVER AND ITS PERITELEVISION CONNECTOR

[75] Inventors: Jean C. Guillon; Jean C. Coschieri; Bernard Duret; Michel Van den Driessche, all of Paris, France

[73] Assignee: Thomson-Brandt, Paris, France

[21] Appl. No.: 364,866

[22] PCT Filed: Aug. 7, 1981

[86] PCT No.: PCT/FR81/00097
§ 371 Date: Mar. 29, 1982
§ 102(e) Date: Mar. 29, 1982

[30] Foreign Application Priority Data
Aug. 8, 1980 [FR] France .................. 80 17534

[51] Int. Cl.³ .................................... H04N 5/22
[52] U.S. Cl. .................................... 358/181
[58] Field of Search ............ 358/183, 181, 310, 335

[56] References Cited
U.S. PATENT DOCUMENTS
3,795,762  3/1974  Willis ................... 358/310

Primary Examiner—Richard Murray
Attorney, Agent, or Firm—Cushman, Darby & Cushman

[57] ABSTRACT

This invention concerns an integrated interface circuit between a television receiver and its peritelevision connector, to allow the connection of an external source such as a magnetoscope. Said circuit comprises a video interface stage ($E_V$), an audio interface stage ($E_A$), and a switching stage ($E_C$), which uses logic signals at its inputs (13, 12, 11) to switch, or not switch, on the one hand a selector switch (I1) in the video stage, and on the other hand two selector switches (I2, I3) in the audio stage.

10 Claims, 1 Drawing Figure

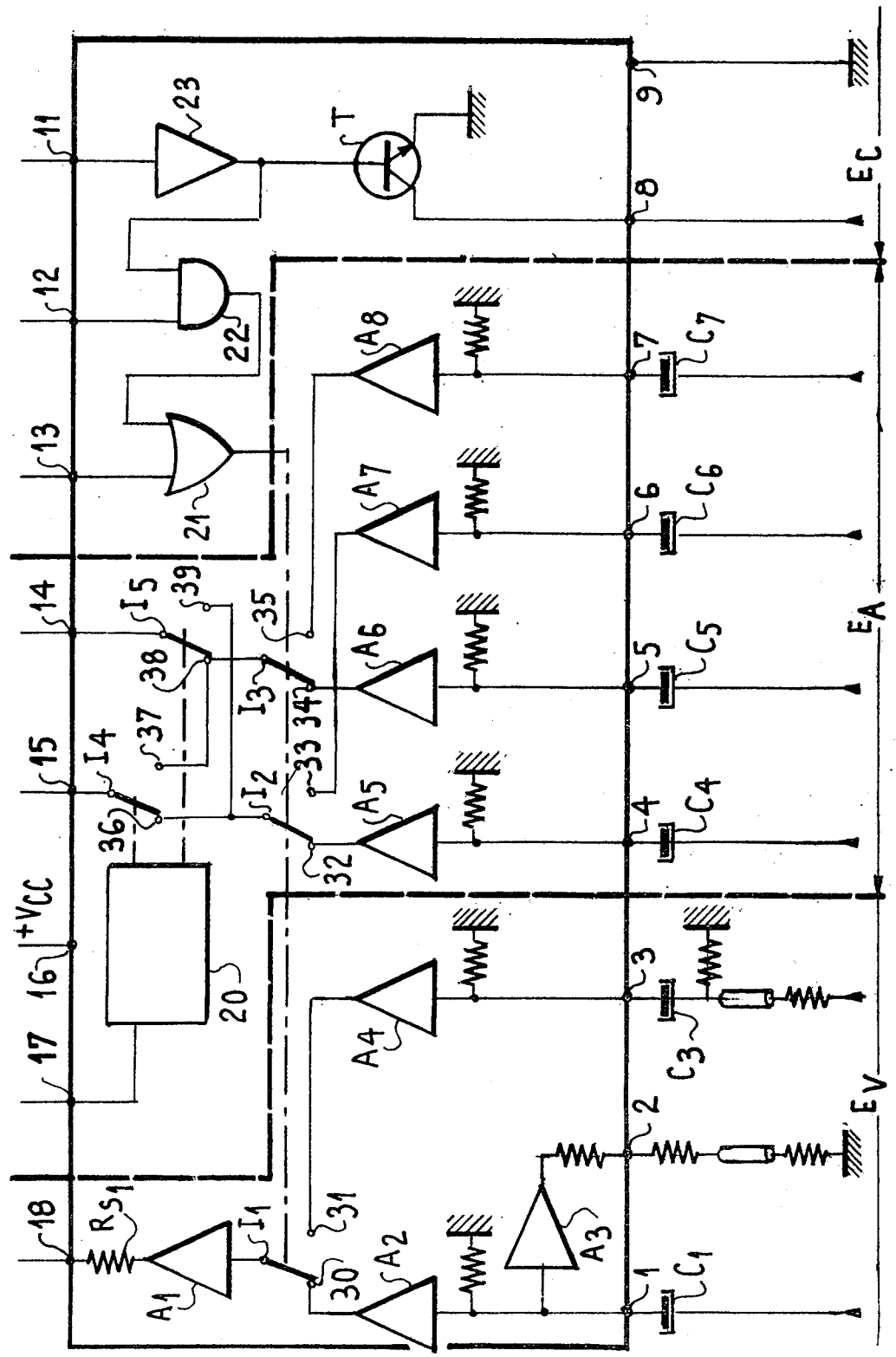

INTEGRATED INTERFACE CIRCUIT BETWEEN A TELEVISION RECEIVER AND ITS PERITELEVISION CONNECTOR

BACKGROUND OF THE INVENTION

This invention concerns an integrated interface circuit between a television receiver and its peritelevision connector, to allow the connection of an external source such as a magnetoscope.

Such circuits, usually constructed from discrete components, are used for the selection of different audio and video tracks, either from a black-and-white or colour television receiver, or from an external source, such as a magnetoscope.

This invention proposes an integrated circuit comprising, in a single circuit, all the stages needed for an effective interface between the television receiver and its peritelevision connector. This considerably reduces the space required, compared with circuits known in the prior art, as well as providing a much better layout inside the receiver, since the peritelevision connector is attached and close to the switching unit. Such a circuit also has the advantage of being much cheaper to produce than existing circuits.

This new integrated interface circuit between a television receiver and its peritelevision connector, for the connection of an external source, such as a magnetoscope, comprises, within a single circuit, a video interface stage, an audio interface stage, and a switching stage, which uses logic signals at its inputs to switch or not switch, on the one hand a selector switch in the video stage, in order to select either the internal video signal from the television receiver, or the external video signal from the external source, and on the other hand selector switches in the audio stage, in order to select either the internal audio signal from the television receiver, or the external audio signal from the external source.

Other benefits and features of the invention will be made clear in the following description of one of many possible embodiments of the invention, illustrated by the accompanying FIGURE, showing the interface circuit in diagrammatical form.

DESCRIPTION OF A PREFERRED EMBODIMENT OF THE INVENTION

The integrated interface circuit comprises a video stage $E_V$, an audio stage $E_A$, and a switching stage $E_C$.

The video stage $E_V$ comprises an input 1, which receives, through a linking capacitor $C_1$, the internal video signal from the output of the video detector circuit of the television receiver.

This internal video signal is fed, on the one hand, into the input of a 1-gain integrated amplifier $A_3$, the output of which is output 2 of the integrated interface circuit. This output 2 is a external low-impedance video output (75 ohms, 1 v), and a 75-ohm cable is used to feed the video signal from the television receiver into a magnetoscope input. The same internal video signal is fed into the input of a one half-gain integrated amplifier $A_2$, the output of which is connected to the first contact point 30 of an electrically controllable switch $I_1$, such as a balanced double differential switch. Operation of this switch is symbolized by the movement of a connecting bar between two contact points.

The second contact point 31 of this switch $I_1$ is connected to the output of a 1-gain integrated amplifier $A_4$, the input of which is the external video input 3 of the integrated interface circuit. This input 3 can receive, through a linking condenser $C_3$, a video signal supplied by an external source, such as a magnetoscope or an "Antiope" decoder, and it accordingly constitutes the video part of the peritelevision connector.

Switch $I_1$ strip is connected to the input of a 1-gain final amplifier $A_1$, the output of which is output 18 of the integrated interface circuit, on which the video signal fed into the television receiver video circuits appears.

When switch $I_1$ strip is positioned on contact point 30, the internal signal from input 1 is conveyed to output 18; when it is on contact point 31, it is the external video signal from input 3 that is conveyed to output 18.

Switch $I_1$ can thus select either the internal video signal or the external video signal from the peritelevision connector.

Amplifiers in this video stage are based on differential amplifiers with negative feedback, which can provide the required waveband performances for a video signal, for example 6 MHz at 0 dB.

According to one feature of the invention, the audio stage $E_A$ of the interface circuit is designed to receive a stereophonic audio signal, so that it can be used in television receivers built to hi-fi standards.

This audio stage comprises two internal audio inputs, a left-hand input 4 and a right-hand input 5. The audio signal from the sound-detector circuit output of the television receiver is fed through linking capacitors $C_4$ and $C_5$ to these inputs 4 and 5.

Each of these inputs is connected to a 1-gain integrated amplifier $A_5$ and $A_6$. The output of amplifier $A_5$ is connected to one contact point of a switch $I_2$, of the same kind as $I_1$ in the video stage $E_V$.

The out put of amplifier $A_6$ is connected to one contact point of another switch $I_3$, of the same kind as $I_2$.

The contact point 33 of switch $I_2$ is connected to the output of a 3-gain integrated amplifier $A_7$, the input to which is input 6 of the interface circuit.

Contact point 35 on switch $I_3$ is connected to the output of a 3-gain integrated amplifier $A_8$, the input of which is input 7 of the interface circuit.

Audio signals from an external source such as a magnetoscope are fed through a linking capacitors $C_6$ and $C_7$ to these iputs 6 and 7, the left-hand audio signal being fed into input 6 and the right-hand signal into input 7

The symbolic bars of the two switches $I_2$ and $I_3$ are twinned, so that they move simultaneously and in the same direction.

When switch $I_2$ bar is on contact point 32 and switch $I_3$ bar on contact point 34, it is the internal audio signals that are transmitted at the output; and when switch $I_2$ bar is on contact point 33, and $I_3$ bar on contact point 35, it is the external audio signals that are transmitted at the output.

In addition, switch $I_2$ bar is connected to one contact point 36 of a switch $I_4$ and to one contact point 39 of a switch $I_5$. Switch $I_3$ strip is connected to the other contact point 37 of switch $I_4$ and the other contact point 38 of switch $I_5$.

Switch $I_4$ bar is connected to the left-hand audio output 15 and switch $I_5$ bar to the right-hand audio output 14. These two outputs are connected to the low-frequency amplifier circuits of the television receiver.

The two switches $I_4$ and $I_5$ are of the same kind as switch $I_1$ in the video stage, and they are controlled by a control unit 20, which supplies two control signals, one for $I_4$ and one for $I_5$, from a signal supplied to input 17 of the integrated interface circuit.

These two switches $I_4$ and $I_5$ allow the interface circuit to be used for either monophonic or stereophonic sound. For example, if internal/external audio selector switches $I_2$ and $I_3$ are in the internal audio position, and if switch $I_4$ bar is on contact point 36 and $I_5$ bar on contact point 38, the audio signal from input 4 is conveyed to output 15 and the audio signal from input 5 to output 14. When switch $I_4$ bar is on contact point 36, and $I_5$ bar on contact point 39, only the input 4 audio signal is conveyed to both outputs 15 and 14. When switch $I_4$ bar is on contact point 37 and $I_5$ bar on contact point 38, only the input 5 audio signal is conveyed to both outputs. When switch $I_4$ bar is on contact point 37 and $I_5$ bar on contact point 39, the input 4 audio signal is conveyed to output 14 and input 5 audio signal to output 15, reversing the left- and right-hand channels.

Switches $I_4$ and $I_5$ have the same effect when switch $I_2$ and $I_3$ are in the external audio position.

The drawback of audio interface circuits comprising discrete components known in the prior art is their unitary gain, which requires the level of audio signals from an external source to be adapted. This problem has been eliminated here by adopting 3-gain amplifiers, and high-fidelity characteristics, in other words a waveband of for example 40 Hz to 16 kHz at 3 dB.

Inputs 6 and 7 of the integrated interface circuit accordingly constitute the audio inputs of the peritelevision connector.

For two-language reception with a receiver designed for the purpose, the audio stage $E_A$ can also select either of the languages. This is done by choosing to transmit the signal present at the left-hand input 6 to both audio outputs 14 and 15 simultaneously, while the right-hand signal is inhibited, or the same may be done with the signal at the right-hand input 7.

The switching stage $E_C$ comprises an "OR" logic gate 21, the high or low output signal from which controls the position of the bars of switches $I_1$, $I_2$ and $I_3$. One input of this gate 21 is input 13 of the interface circuit, and the second input is connected to the output of an "AND" logic gate 22. One input of this gate 22 is input 12 of the interface circuit, while the second input is connected to the output of an inverter logic circuit 23, the input of which is input $I_1$ of the interface circuit. The output of this circuit 23 is connected to the base of a switching transistor T, the emitter of which is connected to earth, while its collector is output 8 of the interface circuit.

An "external audio-visual" message is supplied by the peritelevision connector to input 13 of the switching stage $E_C$. The active status, e.g. a 9 to 12 v signal, positions audio and video switches $I_1$, $I_2$ and $I_3$ in the external reception position, since when a high logic status is present at one input of the "OR" circuit, its output is always high status.

Use of a high-frequency or video magnetoscope involves the use of input 11. A high-frequency magnetoscope is distinguished from a video magnetoscope by a band-selector control signal, fed into interface circuit input 12 of the interface circuit. If the television receiver band selector is positioned on bands III even or uneven, the signal supplied by the magnetoscope is a high-frequency signal.

The active status of input 11, to which an "audio-visual" button may be connected, causes switching of the line-synchronization circuit filter.

The active status of input 11 is a logic low status, namely with a voltage level of between 0 and 4 volts. So there is a logic high status at the reversing 23 output. The voltage corresponding to this high status is applied to the base of transistor T, which thereupon changes from blocked to saturated status. The closure of transistor T causes switching of the line synchronization circuit filter, to which output 8 (transistor T collector) of the interface circuit is connected.

The active status of the band selector (input 12) corresponds to the case in which a video magnetoscope is used, in other words when it is positioned on bands III, even or uneven.

Active status of the audio-visual button (input 11), at the same time as active status of the band selector (input 12), positions switches $I_1$, $I_2$ and $I_3$ on contact points 31, 33 and 35, corresponding to the external reception position, and switches the line-synchronization circuit filter.

Active status of the audio-visual button results in a logic low status at input 11, and active status of the band selector results in a logic high status at input 12. The "AND" gate 22 therefore shows a logic high status at both its inputs. Its output is therefore also a high status, resulting in high status at one input of the "OR" gate 21, the input of which changes to high status, regardless of the status of input 13.

Input 15 of the interface circuit is connected to a DC+voltage power unit, and input 9 to earth. These two inputs power the various components of the interface circuit.

This circuit can be constructed using bipolar technology. It is perfectly suitable for television receivers built to French and other standards and particularly to upmarket sets, since it allows the television receiver to be used to amplify an external stereophonic source, and even, when transmissions and reception are in stereo, an internal source.

The invention is not limited to the embodiments described herein; many modifications and variants may be envisaged by those skilled in the art within the scope of the invention as defined in the appended claims.

What is claimed is:

1. An integrated interface circuit for connecting a television receiver and its peritelevision connector comprising within a single integrated circuit;

a video interface stage having an internal input and an external input for each receiving a video signal and a video output, and video switch means connecting said internal input to said output in a first position and said external input to said output in a second position;

an audio interface stage having left and right hand internal video signal inputs and left and right hand external audio signal inputs, left and right hand outputs, first switch means connecting in a first position said right and left internal inputs to said right and left outputs, respectively, and in a second position said right and left external inputs to said right and left outputs, respectively, and a second switch means connecting in a first position a right input to a right output and a left input to a left output and in a second position said left and right inputs to both said left and right outputs;

an external switching stage for controlling said switch means of said video stage and said first switching means responsive to an input for selecting internal or external signals; and means for controlling said second switching means.

2. A circuit as in claim 1, wherein each said switch means includes first and second switches, the common terminals of the switches of the second switch means being respectively connected to the right and left outputs, the common terminals of the switches of the first switch means being each connected to a contact point of one of the switches of the second switch means.

3. A circuit as in claim 2, wherein said audio stage includes first and second amplifiers, respectively connecting said right and left internal inputs to one contact of said first and second switches of said first switch means and third and fourth amplifiers, respectively connecting said right and left external inputs to the other contact of said first and second switches of said first switch means.

4. A circuit as in claim 3, wherein said amplifiers connected to internal inputs are 1-gain amplifiers and said amplifiers connected to said external inputs are 3-gain amplifiers.

5. A circuit as in claim 1, wherein said external stage includes an "OR" gate having an output controlling said switch means of said video stage and said first switch means and a first input for receiving an external control signal, and "AND" gate having an output connected to the second input to said "OR" gate and a first input for receiving a band selector control signal, and an inverter having an input for receiving a control signal from a receiver audio visual button.

6. A circuit as in claim 5, wherein said external stage further includes a switching transistor having its output connected to the inverter output and its collector connected to a line synchronization circuit filter.

7. A circuit as in claim 1, wherein said video stage includes first and second amplifiers each connecting an input to a terminal of said video switch means.

8. A circuit as in claim 7, wherein the amplifier connected to the internal input has a gain of ½ and the amplifier connected to the external input has a gain of 1 and wherein said video stage further includes a fifth amplifier with a gain of 1 connected between said video output and the common terminal of said video switch means.

9. A circuit as in claim 8, wherein said video stage further includes an external video output and an amplifier with a gain of 1 connecting said external output to said internal input.

10. An integrated interface circuit for connecting a television receiver and its peritelevision connector comprising within a single integrated circuit:

a video interface stage having an internal input and an external input for each receiving a video signal and a video output, and video switch means connecting said internal input to said output in a first position and said external input to said output in a second position;

an audio interface stage having left and right hand internal video signal inputs and left and right hand external audio signal inputs, left and right hand outputs, audio switch means connecting in a first position said right and left internal inputs to said right and left outputs, respectively, and in a second position said right and left external inputs to said right and left outputs, respectively; and an external switching stage for controlling said video switch means and said audio switch means responsive to an input for selecting internal or external signals including an "OR" gate having an output controlling said video switch means and said audio switch means and a first input for receiving an external control signal, an "AND" gate having an output connected to the second input to said "OR" gate and a first input for receiving a band selector control signal, and an inverter having an output connected to the other input to said "AND" and an input for receiving a control signal from a receiver audio visual button.

* * * * *